(12) United States Patent
Vitkala

(10) Patent No.: US 6,845,633 B2
(45) Date of Patent: Jan. 25, 2005

(54) METHOD AND APPARATUS FOR HEATING GLASS PANELS IN A TEMPERING FURNACE EQUIPPED WITH ROLLERS

(75) Inventor: Jorma Vitkala, Tampere (FI)

(73) Assignee: Tamglass Ltd. OY, Tampere (FI)

( * ) Notice: Subject to any disclaimer, the term of this patent is extended or adjusted under 35 U.S.C. 154(b) by 499 days.

(21) Appl. No.: 10/098,530

(22) Filed: Mar. 18, 2002

(65) Prior Publication Data

US 2002/0134109 A1 Sep. 26, 2002

(30) Foreign Application Priority Data

Mar. 16, 2001 (FI) .............................................. 20010528

(51) Int. Cl.[7] .............................................. C03B 27/04
(52) U.S. Cl. .......................... 65/29.19; 65/115; 65/119; 65/161; 65/162; 65/349; 65/350; 65/370.1
(58) Field of Search ................ 65/29.19, 115, 65/119, 161, 162, 349, 350, 370.1

(56) References Cited

U.S. PATENT DOCUMENTS

| | | | |
|---|---|---|---|
| 4,336,442 A | | 6/1982 | Starr |
| 4,505,671 A | | 3/1985 | McMaster |
| 4,824,464 A | * | 4/1989 | Perin et al. ................... 65/106 |
| 4,957,532 A | * | 9/1990 | Jacobson et al. ............. 65/273 |
| 5,122,180 A | * | 6/1992 | Mathivat et al. .............. 65/162 |
| 5,620,492 A | * | 4/1997 | Land ........................... 65/348 |
| 5,951,734 A | | 9/1999 | Friedel et al. |

FOREIGN PATENT DOCUMENTS

WO        98/01398        1/1998

* cited by examiner

Primary Examiner—Sean Vincent
(74) Attorney, Agent, or Firm—Burns, Doane, Swecker & Mathis, L.L.P.

(57) ABSTRACT

In a method and an apparatus for heating glass panels in a tempering furnace equipped with rollers, glass panels are carried on a conveyor defined by rollers into a tempering furnace for the duration of a heating cycle, followed by carrying the glass panels into a tempering station. The glass panels are heated in the tempering furnace by bottom- and top-heating radiation elements as well as by bottom- and top-heating convection elements through which convection air is supplied to the tempering furnace. The glass panels' bottom side is heated by the bottom-heating convection elements, which are arranged lengthwise along the furnace and define convection heating zones side by side in a lateral direction of the tempering furnace. Thus, convection heating effects of the convection heating zones can be altered relative to each other for profiling the heat transfer coefficient in a lateral direction of the furnace.

18 Claims, 5 Drawing Sheets

METHOD AND APPARATUS FOR HEATING GLASS PANELS IN A TEMPERING FURNACE EQUIPPED WITH ROLLERS

The invention relates to a method for heating glass panels in a tempering furnace equipped with rollers, said method comprising carrying the glass panels on a conveyor established by the rollers into a tempering furnace for the duration of a heating cycle, followed by carrying the glass panels into a tempering station, and heating the glass panels in the tempering furnace by means of bottom- and top-heating radiation elements, as well as by bottom- and top-heating convection elements whereby convection air is supplied into the tempering furnace.

The invention relates also to an apparatus for heating glass panels in a tempering furnace equipped with rollers, said rollers establishing a conveyor for carrying the glass panels into the tempering furnace, as well as into a tempering station in communication with the tempering furnace, said tempering furnace being provided with radiation heating elements below and above the glass panel, as well as with convection heating elements below and above the glass panel whereby convection air is supplied into the tempering furnace.

This type of method and apparatus are prior known from the Applicant's earlier patent publication U.S. Pat. No. 5,951,734. This prior known method and apparatus are particularly suitable for heating top-coated, so-called Low-E glass panels, as the overhead convection heating effect can be profiled in a lateral direction of the furnace. Patent publication U.S. Pat. No. 4,505,671, for example, discloses the use of bottom convection heating accompanied by top convection heating, but due to inconvenience caused by the rollers, the convection pipes have always been set in a lateral or transverse direction of the furnace, making the lateral profiling of bottom convention impossible.

It is desirable to provide a sub-glass convection jet, which enables a cross-furnace control over the heat transfer coefficient applied to the bottom side of the glass.

A sub-glass convection jet, which enables a cross-furnace control over the heat transfer coefficient applied to the bottom side of the glass can be achieved through a method and an apparatus according to aspects of the present invention. Finnish Patent Application No. 20010528, filed Mar. 16, 2001, discloses a method and apparatus and is incorporated by reference.

BRIEF DESCRIPTION OF THE DRAWINGS

Exemplary embodiments of the invention will now be described in more detail with reference to the accompanying drawings, in which:

FIG. 2A is a schematic perspective view of a heating element according to an embodiment of the present invention;

DETAILED DESCRIPTION

Figure 1:
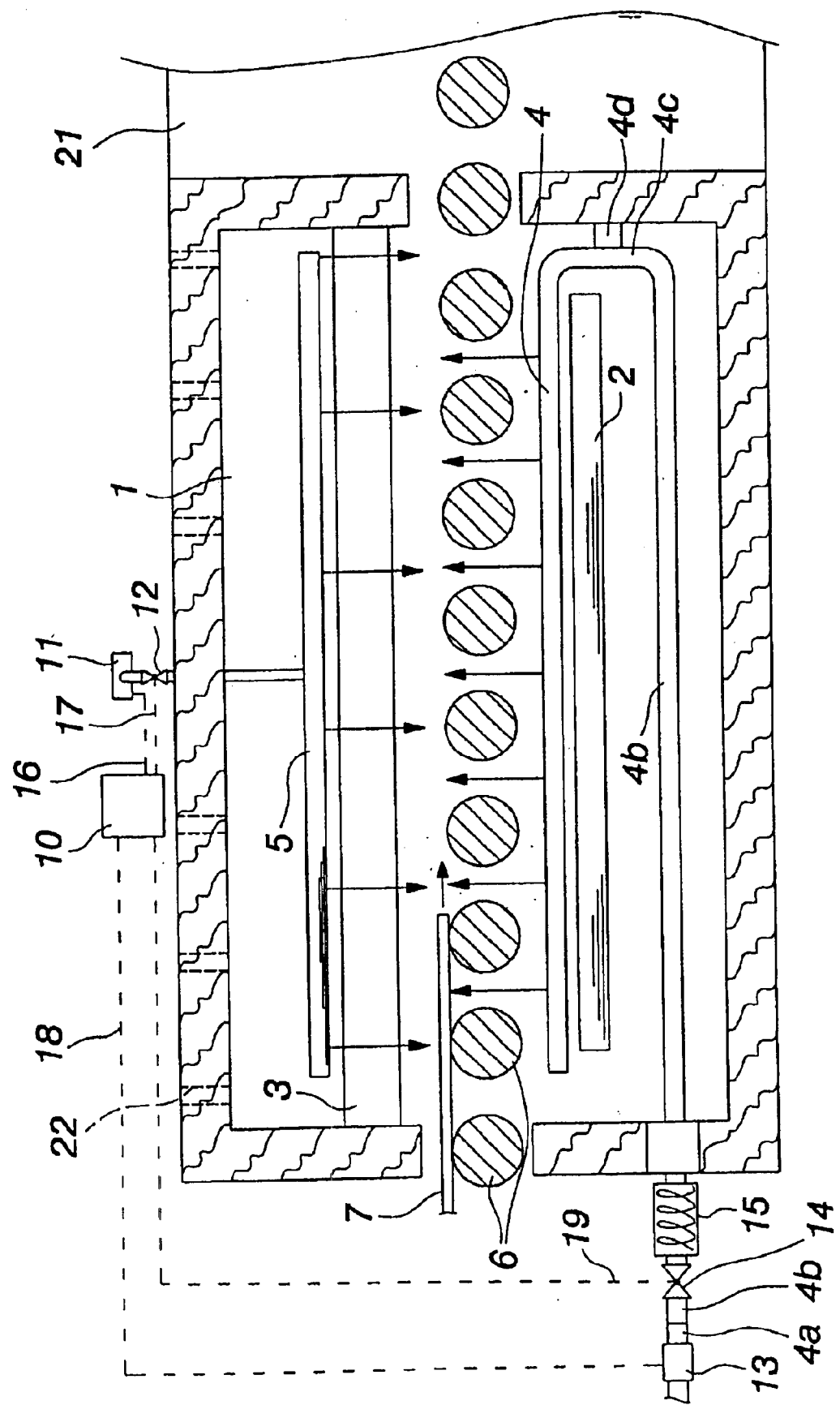
FIG. 1 is a schematic, cross-sectional, side view of a tempering furnace according to an embodiment of the present invention.
Figure 2:
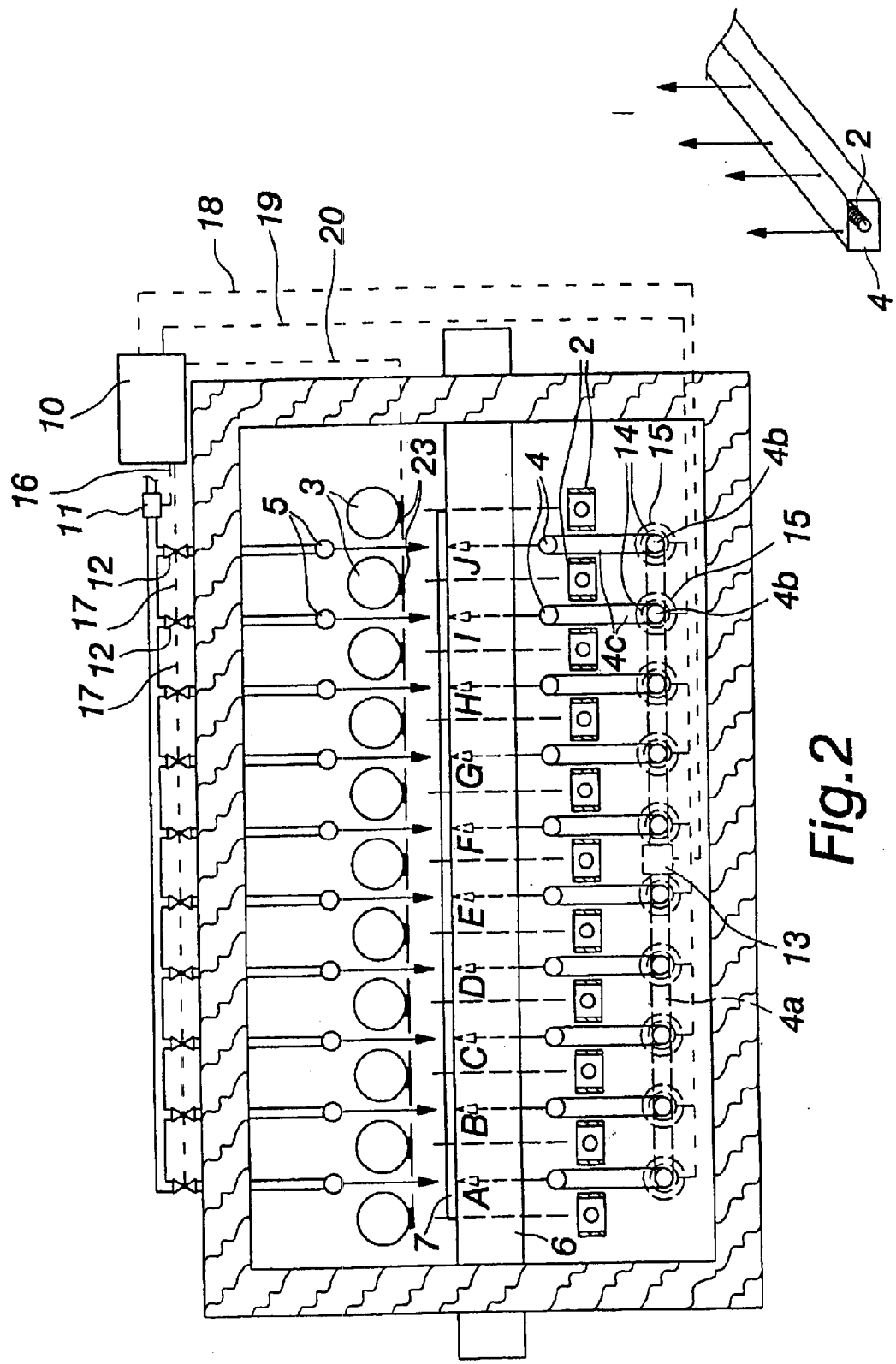
FIG. 2 is a schematic, cross-sectional, front view of the tempering furnace of FIG. 1.

FIGS. 1 and 2 illustrate a tempering furnace 1 for applying a method of the invention, wherein a glass panel 7 is heated. The glass panel 7 is delivered into the furnace 1 by means of a conveyor established by rollers 6 which are lateral to the lengthwise direction of the furnace 1. In the depicted embodiment, the glass panel 7 is set in the furnace 1 in an oscillating motion for the duration of a heating cycle. The furnace 1 is provided with an extension in the form of a tempering station 21, the glass panel 7 being transferred therein following the heating performed in a heating station.

The tempering furnace 1 is provided with radiation heating elements 3 mounted above the rollers 6, i.e. with top-heating radiation elements. These comprise preferably resistances which are lengthwise of the tempering furnace 1, but may also extend in a lateral direction of the tempering furnace 1. Above the rollers 6 are also mounted top-heating convection elements 5. These comprise preferably pipes 5 lengthwise of the tempering furnace 1, which are set at appropriate distances from each other in a lateral direction of the furnace. The pipes 5 have bottom surfaces thereof formed with orifices spaced from each other in a lengthwise direction of the pipe for releasing convection air from the pipe 5 in the form of jets and onto the glass panel's 7 top surface. The jets are directed to pass through spaces between the heating resistances 3, in the present case through each inter-resistance space. Optionally, the pipes 5 can be located below the resistances 3. The jets are directed either straight down or diagonally sideways.

The tempering furnace 1 is provided with radiation heating elements 2 located below the rollers 6, i.e. with bottom-heating radiation elements. These are preferably also resistances lengthwise of the tempering furnace 1. Below the rollers 6 and/or the resistances 2 are located bottom-heating convection elements 4, 4a, 4b, 4c. These comprise pipes lengthwise of the tempering furnace 1, which are set in a lateral direction of the furnace 1 at appropriate distances from each other. The sections of the pipes 4 closest to the bottom side of the glass 7 have their top surface formed with orifices spaced from each other in a lengthwise direction of the pipe for releasing convection air from the elements 4 as jets to the bottom side of the glass panel 7 and/or to the surfaces of the rollers 6. Each of such bottom-heating convection elements defines convection heating zones A, B, C, D, E, F, G, H, I, J side by side in a lateral direction of the tempering furnace 1. The flow of convection air can be adjusted or regulated in a lengthwise direction of the pipes 4, i.e. with respect to zones at various positions, by dividing the pipe 4 lengthwise in discrete sections, which are supplied with different pressures for implementing a varying transfer of heat also lengthwise of the furnace. Alternatively, the lengthwise adjustment can also be implemented by means of jet orifices of varying sizes or by reducing or extending the relative distance between the orifices, e.g. in such a way that along a part of the furnace length, especially at both ends of the furnace, a jet is delivered through every other inter-roller space, but along some of the furnace length, especially along the mid-section of the furnace, a jet is delivered through every inter-roller space.

The amount of air matching that blown into the furnace 1 is exhausted, for example by way of discharge openings 22 present in the roof of the furnace 1 or by way of counter-current heat exchangers 24 established in communication with pre-heaters 15.

At least the bottom-heating convection elements 4, 4a, 4b, 4c are provided with an elongated tubular heating duct 4b, wherein the advancing convection air warms up prior to its release from the pipe element 4 of the furnace 1. In communication with the pipe element 4b, preferably outside the furnace 1, is provided a valve 14 for adjusting the volume flow of convection air in a single convection heating element 4. A single valve can also be used for adjusting or regulating the volume flow of more than one element. In communication with top-heating convection air pipes are also respectively provided valves 12 for adjusting the volume flow of convection air in a single (or more) top-heating convection air element 5. Furthermore, at least bottom-heating convection air can be preheated by means of a pre-heater 15 set outside the furnace 1 in communication with the pipes 4b. The pre-heater 15 can be a resistance heater. Thus, each convection heating zone A, B, C, D, E, F, G, H, I, J can be supplied with a zone-specific, sub-glass convection jet, which enables a cross-furnace control over the heat transfer coefficient applied to the bottom side of glass. Separate zones may have different temperatures and/or different jet pressures and/or different timings for the initiation, termination or duration of a jet. For example, the mid-section of glass can be subjected to a convection heat effect which is more intense than the one applied to the edges. Therefore, the jets applied to edge areas can be of shorter duration than those applied to mid-sections. The jet applied to the mid-section and the edges can be continuous, yet unequal in terms of its total duration, or the edges can be subjected to intermittent jets.

In the exemplary embodiment of FIG. 2A, the jet pipes 4 and the radiation heating elements 2 are combined in such a way that the jet pipe 4 is defined by a casing or a supporting structure for the radiation heating element 2. The jet orifices may have a wide variety of arrangements and orientations. In addition to or instead of a perpendicular jet, the jets may be directed diagonally sideways and/or diagonally lengthwise.

The valves 12 and 14 for the bottom-heating and top-heating convection elements 4 and 5 are controlled by means of a control system 10. The top-heating radiation elements 3 are provided with temperature sensors 23 or the like for measuring the temperature of the top-heating radiation elements 3. When the glass panel 7 is delivered into the furnace, the radiation heating element 3 present thereabove is cooled by said glass panel 7 by as much as dozens of centigrades. Information regarding a change in the temperature of the radiation heating element 3 is transmitted by the temperature sensor 23 along a data bus 20 to the control system 10, wherein the information received from the sensor 23 is compared with a set value of the control system 10, followed by increasing the power output of those radiation heating elements 3 at which the measured value falls short of the set value. Thus, temperature differences and/or temperature changes (rapid cooling) of the radiation heating elements 3 provide the control system 10 indirectly with information regarding the size, particularly the width of a glass panel brought into the furnace. Naturally, the loading pattern of a glass panel can also be read by means of separate optical or capacitive sensors located upstream of the furnace. A control command is transmitted from the control system 10 along a data transfer bus 19 to each valve 14. The valve which is shut off is preferably one that regulates the flow of convection air of such a convection heating element 4/5 or such convection heating elements which have no glass panel in alignment therewith or whose jets would pass through between switched-off resistances 2/3 or underneath the same at the respective location. The rest of the valves 14, which control the convection heating elements 4 positioned underneath the glass panel, are adjusted so as to provide the bottom side of the glass panel 7 with a heating profile predetermined for this particular glass panel 7. The profile can be established either by applying a convection jet for a certain period of time to the bottom side of the glass 7 or by adjusting the volume flow and/or temperature of convection air to comply with the heating profile.

In the time-regulated profiling process regarding the heat transfer coefficient for the bottom side of a glass panel, some of the valves 14 can be open from the beginning of a heating cycle, and the rest of the valves 14 open up later during the heating cycle. This on/off regulation of the valves 14 can be further accompanied by a stepless regulation for volume flow or pressure.

In the case of FIG. 1, the pipe element 4b is passed below the resistances 2 from the upstream end to the downstream end of a furnace and secured to the wall at the downstream of the furnace by means of a fastener 4d, the actual pipe element 4 with jet orifices being passed from the downstream end to the upstream end of the furnace between the resistances 2 and the rollers 6. The pipe section 4 can be braced to a housing structure of the resistances 2. The pipe sections or elements 4 are positioned between the resistances 2 so as not to provide a substantial screen for upward directed radiation heat. Since the temperate of air flowing within the pipe element 4 no longer exhibits any major changes along the length of the pipe element 4, the lengthwise changes of the pipe element 4 as a result of thermal expansion shall remain insignificant at the furnace operating temperature. Thus, the blasting jets find their way accurately between the rollers 6. The attachments and dimensions of the pipes are naturally calculated in such a way that the blasting jets find the desired targets after the occurrence of thermal expansions appearing during the start-up of a furnace. Each inter-roller space may be provided with a plurality of orifices delivering the blasting jets, e.g. in view of producing jets issuing at an acute angle relative to each other and having an inclination which can be either in the lateral and/or longitudinal direction of a furnace. The jets may also hit the rollers 6 partially or totally. However, it is not advisable to aim the jets directly at the bottom surfaces of the rollers, as this shall undermine the convection heating effect applied to the bottom side of glass.

The pressure of convection air prevailing in the bottom-heating convection elements is set by means of a regulator 13, which receives its control from the control unit 10 by way of a control line 18. The regulator 13 need not be a separate unit but, instead, it can be connected with every valve 14. The valves 14 may also be provided with a manual regulation system.

The pressure level of convection air in the top-heating convection elements is set by means of a regulator 11, which receives its control from the control unit 10 by way of a control line 16. A control line 17 is used for controlling valves 12, which are operated for regulating a jet of convection air to individual to-heating convection elements 5. This also enables a cross-furnace profiling of the heat transfer coefficient for the top side of glass, as described in more detail in the Applicant's patent publication U.S. Pat. No. 5,951,734.

Figure 3:
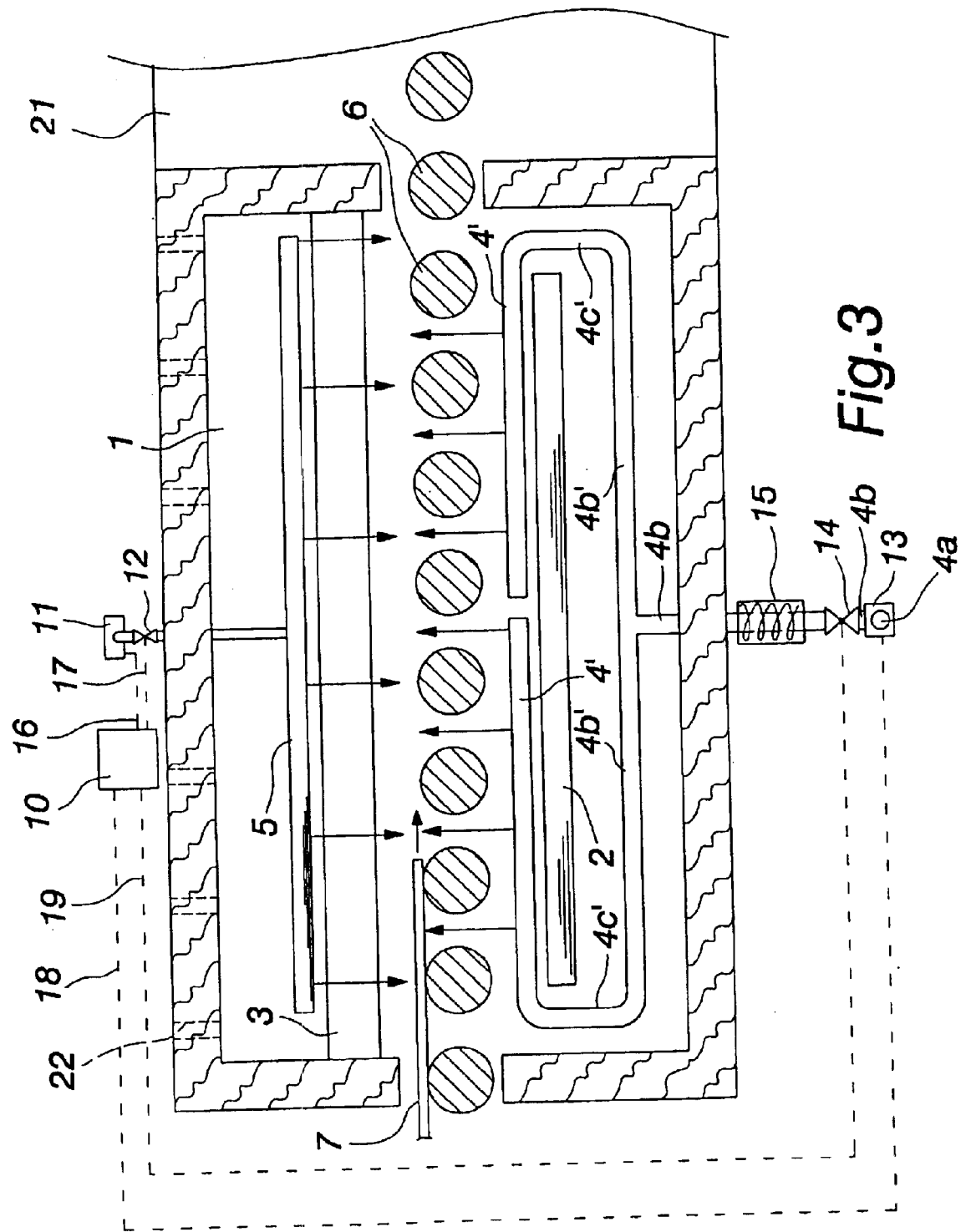
FIG. 3 is a schematic, cross-sectional, side view of a tempering furnace according to another embodiment of the present invention.
Figure 4:
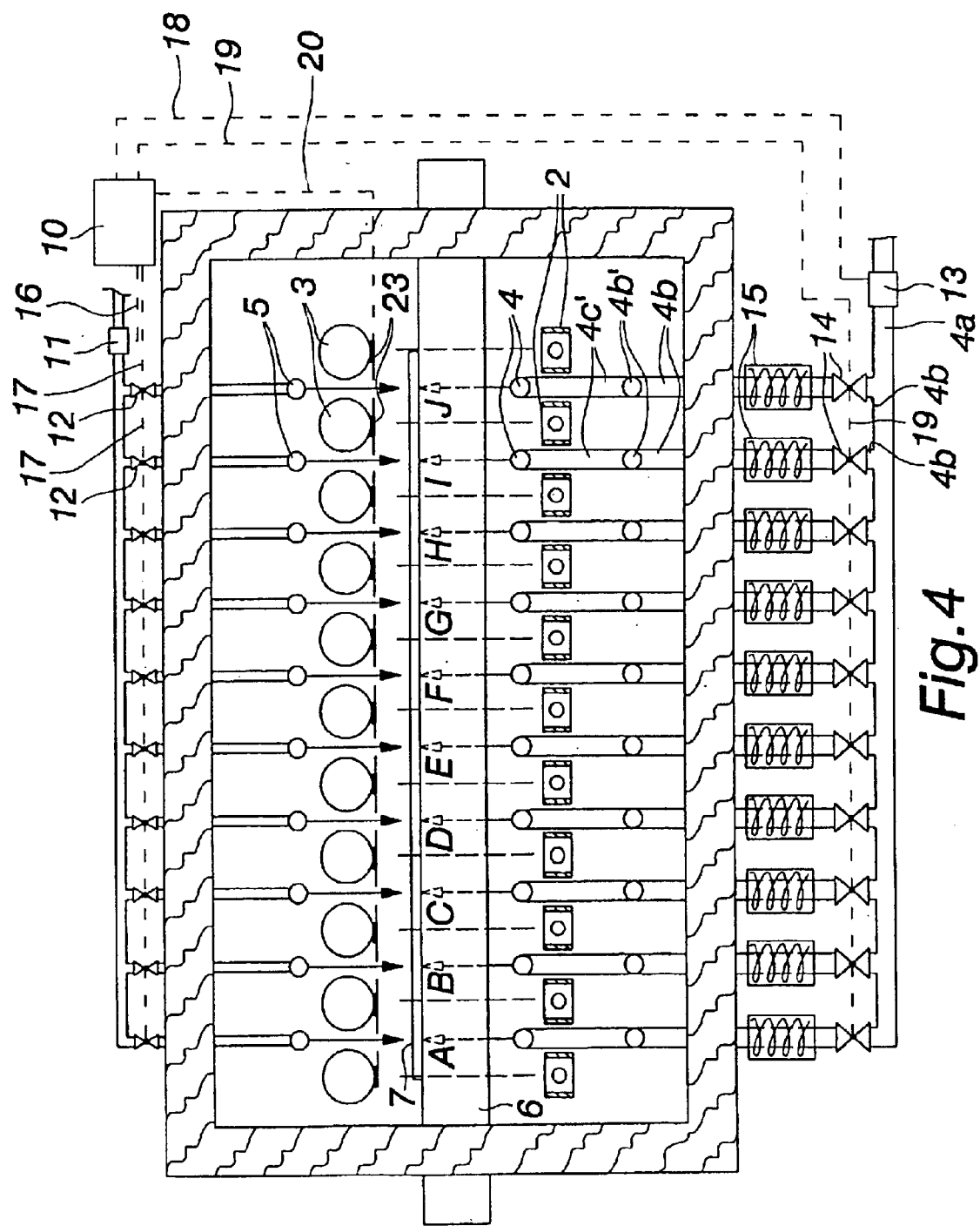
FIG. 4 is a schematic, cross-sectional, front view of the tempering furnace of FIG. 3.

The embodiment of FIGS. 3 and 4 only differs from that of FIGS. 1 and 2 in the sense that the pipe constituting a bottom-heating convection element is extended within a furnace in such a way that the pipe element 4b is brought inside through the furnace floor at the mid-section of the furnace (as viewed in longitudinal direction). The pipe 4b is branched underneath the resistances 2 in opposite directions for pipe branches 4b', which continue as upstanding pipe sections 4c' at the opposite ends of the furnace and continue further as pipe branches 4' directed from the furnace ends towards the mid-section of the furnace and located between the resistances 2 and the rollers 6 and are provided with jet orifices for directing air jets through between the rollers 6 towards the bottom side of the glass panel 7.

A third alternative, not shown in the drawings, for bringing the bottom-heating convection air pipes into a furnace is such that the pipes are brought inside the furnace alternately from the opposite ends of the furnace, whereby the directions of flow within the pipes inside the furnace are alternately opposite to each other in adjacent pipes. Consequently, the warming of air within the pipes does not cause imbalance in heating between the opposite ends of the furnace.

The top- and bottom-heating convection jet pipes 5 and 4 need not be in alignment with each other. On the other hand, the timing of their operation during a heating cycle is preferably effected in such a way that at the early stages of a heating cycle the convection heating is substantially more intense at the top side of the glass panel 7 and at the final stages of a heating cycle the convection heating is more intense at the bottom side of the glass panel 7. The mutual relationship between top- and bottom-heating jet capacities can be altered during a heating cycle, e.g. in such a way that the initially strong top-heating jet becomes weaker and close to the end of a heating cycle becomes stronger again, such that the bottom-heating jet can be intensified respectively more at the end of a heating cycle. As a consequence, the total transfer of heat improves and heating becomes faster while the balance between top- and bottom-heating effects is maintained despite a strong bottom-heating jet at the end of a heating cycle. The mutual relationship between top and bottom heating requirements, as well as its fluctuation during a heating cycle, is characteristic of each type of glass. The bottom-heating jet can be rather weak in the beginning of a heating cycle and, after the half-way point of a heating cycle, the jet capacity can be increased in such a way that a graph representing the jet capacity as a function of time has an angular coefficient which is constant, stepwise changing, or continuously changing (more and more steeply rising curve), or any combination thereof.

Figure 5:
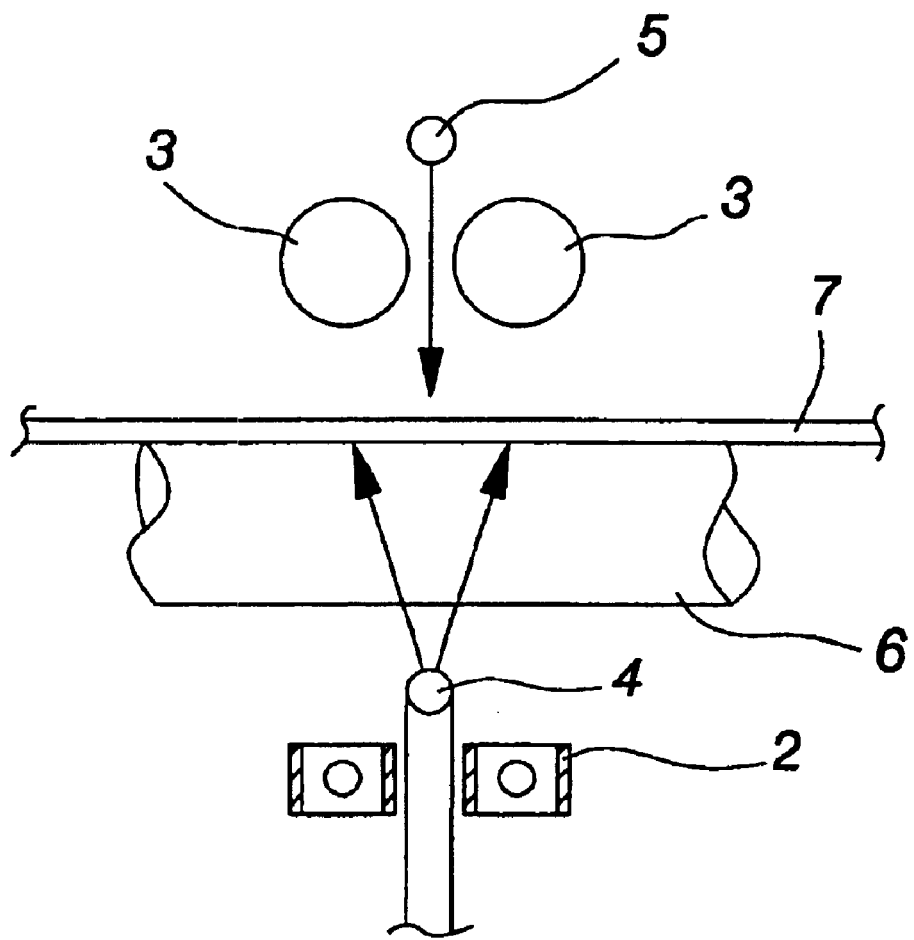
FIG. 5 is a schematic, cross-sectional view of a portion of a furnace according to an embodiment of the present invention showing establishment of top and bottom convection blasts relative to each other and to furnace components.

FIG. 5 illustrates how the bottom-heating pipe 4 has its blasting jets directed diagonally at a V-angle sideways, the jets hitting target points which lie on either side of the targeting line for air jets from the top-heating pipe 5. As the top-and bottom-heating jets hit targets that are spaced from each other in the lateral direction of a furnace, the creation of hot lines in the advancing direction of glass will be avoided or reduced and the heating effect can be distributed more evenly over the entire surface area of glass. The top-heating pipes 5 may blow their jets through between the top-heating resistances, while the bottom-heating pipes may launch their jets from above the bottom-heating resistances.

What is claimed is:

1. A method for heating glass panels in a tempering furnace equipped with rollers, the method comprising:
    carrying glass panels on a conveyor, the conveyor being at least partially formed by rollers, into a tempering furnace for a heating cycle;
    after the heating cycle, carrying the glass panels into a tempering furnace;
    heating the glass panels in the tempering furnace using bottom- and top-heating radiation elements as well as heating the glass panels in the tempering furnace using bottom- and top-heating convection elements with convection air supplied into the tempering furnace, wherein the bottom-heating convection elements are disposed lengthwise of the tempering furnace and define convection heating zones side-by-side in a lateral direction of the tempering furnace.

2. The method as set forth in claim 1, wherein the bottom-heating convection elements are adapted to provide a bottom-heating convection effect and are controlled so that heating effects in the convection heating zones are altered relative to each other.

3. The method as set forth in claim 2, wherein the top-heating convection elements are disposed lengthwise of the tempering furnace and define top convection heating zones side-by-side in a lateral direction of the tempering furnace and the top-heating convection elements are adapted to provide a top-heating convection effect and are controlled so that heating effects in the top convection heating zones and in top sides of the glass panels are altered relative to each other.

4. The method as set forth in claim 3, wherein the bottom-heating convection elements and the top-heating convection elements are controlled so that bottom- and top-heating convection effects substantially follow each other.

5. The method as set forth in claim 2, wherein the bottom-heating convection elements are controlled to alter bottom-heating convection effects in the convection heating zones relative to each other by controlling at least one of volume flow, temperature, and jet duration of convection air.

6. The method as set forth in claim 5, wherein the bottom-heating convection elements are controlled so that jet duration of convection air is shorter at edge zones of the glass panels than at mid-sections of the glass panels.

7. The method as set forth in claim 2, wherein the bottom-heating convection elements are controlled to alter bottom-heating convection effects in the convection heating zones relative to each other by controlling flow of convection air to the bottom-heating convection elements.

8. The method as set forth in claim 2, wherein the bottom-heating convection elements are controlled to alter bottom-heating convection effects in the convection heating zones relative to each other by switching on and off flow of convection air to the bottom-heating convection elements.

9. The method as set forth in claim 2, wherein the top-heating convection elements are adapted to provide a top-heating convection effect and are controlled so that heating effects in the top convection heating zones and in top sides of the glass panels are altered relative to each other, and wherein bottom-heating convection effects and top-heating convection effects are varied during a heating cycle for a glass panel such that, during one stage of a heating cycle for the glass panel, convection heating at a top side of the glass panel is more intense than convection heating at a bottom side of the glass panel and, during a subsequent stage of the heating cycle, convection heating at the bottom side of the glass panel is more intense than convection heating at the top side of the glass panel.

10. The method as set forth in claim 3, further comprising measuring temperatures of the top-heating radiation elements, comparing measured temperatures with a set value, and increasing power to ones of the radiation heating elements having measured temperatures below the set value, and providing top- and bottom-heating convection effects only to those convection zones in radiation heating elements to which power is being increased are located.

11. An arrangement for heating glass panels in a tempering furnace, comprising:

a tempering furnace;

a tempering station in communication with the tempering furnace;

rollers defining a conveyor for carrying glass panels along a path of travel into the tempering furnace and the tempering station;

the tempering furnace including bottom radiation heating elements below and top radiation heating elements above the path of travel, and bottom convection heating elements below and and top convection heating elements above the path of travel arranged to supply convection air to the tempering furnace, the convection heating elements below the path of travel extending along a length of the tempering furnace and defining convection heating zones disposed side by side in a lateral direction of the tempering furnace.

12. The arrangement as set forth in claim 11, wherein the bottom convection heating elements include regulators adapted to adjust at least one of volume flow, temperature, and jet duration of convection air in the bottom convection heating elements in order to vary convection heating effects in the convection heating zones.

13. The arrangement as set forth in claim 11, wherein the tempering furnace includes a control unit for varying convection heating effects in the convection heating zones.

14. The arrangement as set forth in claim 13, wherein the top radiation heating elements include temperature sensors for measuring temperatures of the top radiation heating elements and the control unit adjusts at least one of volume flow, temperature, and jet duration of convection air in the bottom convection heating elements in order to vary convection heating effects in the convection heating zones in response to signals from the temperature sensors.

15. The arrangement as set forth in claim 11, wherein the bottom heating convection elements include heating ducts in which convection air is warmed up prior to release into the tempering furnace, the heating ducts extending along a length of the tempering furnace.

16. The arrangement as set forth in claim 15, wherein the heating ducts extend along at least half of the furnace length.

17. The arrangement as set forth in claim 11, wherein the bottom radiation heating elements include a casing defining a jet pipe for convection air.

18. The arrangement as set forth in claim 11, wherein the bottom heating convection elements and the top heating convection elements are arranged so that jets of convection air therefrom are adapted to hit a glass panel at points that are displaced relative to each other in a lateral direction of the furnace.

* * * * *